US008317586B2

(12) United States Patent

Ansari et al.

(10) Patent No.: US 8,317,586 B2

(45) Date of Patent: Nov. 27, 2012

(54) WAGERING GAME MACHINE OPERATIONAL SIMULATION

(75) Inventors: Marwan Ansari, Plainfield, IL (US); Allon Englman, Chicago, IL (US); Vernon W. Hamlin, Lisle, IL (US); Jeremy Hornik, Chicago, IL (US); Joel R. Jaffe, Glenview, IL (US)

(73) Assignee: WMS Gaming Inc., Waukegan, IL (US)

( * ) Notice: Subject to any disclaimer, the term of this patent is extended or adjusted under 35 U.S.C. 154(b) by 306 days.

(21) Appl. No.: 12/678,015

(22) PCT Filed: Sep. 23, 2008

(86) PCT No.: PCT/US2008/011013

§ 371 (c)(1), (2), (4) Date: Mar. 12, 2010

(87) PCT Pub. No.: WO2009/045288

PCT Pub. Date: Apr. 9, 2009

(65) Prior Publication Data

US 2010/0267437 A1 Oct. 21, 2010

Related U.S. Application Data

(60) Provisional application No. 60/976,053, filed on Sep. 28, 2007.

(51) Int. Cl.

*A63F 13/00* (2006.01)
*A63F 13/10* (2006.01)

(52) U.S. Cl. ................ 463/16; 463/12; 463/13; 463/20; 463/21; 273/138.1; 273/139; 273/292

(58) Field of Classification Search ............. 463/10–13, 463/16, 20–22, 25, 29, 40–42; 273/138.1, 273/139, 142 B, 142 A, 142 J, 148 A, 149 P, 273/149 R, 243, 292–293, 304, 306, 309; *A63F 13/00, 13/10*

See application file for complete search history.

(56) References Cited

U.S. PATENT DOCUMENTS

| | | | | |
|---|---|---|---|---|
| 5,401,023 | A * | 3/1995 | Wood | 463/13 |
| 5,505,457 | A * | 4/1996 | Boylan et al. | 273/274 |
| 5,513,850 | A * | 5/1996 | Vancura | 273/274 |
| 5,676,375 | A * | 10/1997 | Pirouzkhah | 273/274 |

(Continued)

OTHER PUBLICATIONS

"International Application Serial No. PCT/US2008/011013, Search Report mailed on Dec. 8, 2008" 3 pgs.

(Continued)

*Primary Examiner* — Arthur O. Hall

(74) *Attorney, Agent, or Firm* — Schwegman Lundberg & Woessner, P.A.

(57) ABSTRACT

Apparatus, systems, and methods may operate to acquire an original player input value associated with a wagering game. One or more simulations may be run in reverse from a randomly selected statistical outcome to determine at least one of a modified starting game parameter value, a modified intermediate-time game parameter value, and a modified player input value. Original starting game parameter values, intermediate-time game parameter values, and/or player input values may be modified to provide the modified starting game parameter values, intermediate-time game parameter values, and player input values, respectively. At least a portion of the simulation running forward based on the modified values may be displayed. Other apparatus, systems, and methods are disclosed.

20 Claims, 7 Drawing Sheets

U.S. PATENT DOCUMENTS

| | | | | |
|---|---|---|---|---|
| 5,702,106 | A * | 12/1997 | Alvarez, Jr. | 273/292 |
| 6,592,457 | B1 * | 7/2003 | Frohm et al. | 463/16 |
| 6,824,467 | B2 | 11/2004 | Schlottmann et al. | |
| 7,179,166 | B1 * | 2/2007 | Abbott | 463/9 |
| 7,695,359 | B2 * | 4/2010 | Gail et al. | 463/13 |
| 7,794,318 | B2 * | 9/2010 | Lind et al. | 463/19 |
| 2005/0064926 | A1 * | 3/2005 | Walker et al. | 463/16 |
| 2006/0033281 | A1 * | 2/2006 | Wong | 273/292 |
| 2006/0094506 | A1 * | 5/2006 | Tarter et al. | 463/42 |
| 2006/0101383 | A1 * | 5/2006 | Raffo | 717/104 |
| 2006/0166727 | A1 * | 7/2006 | Burak | 463/16 |
| 2007/0054724 | A1 * | 3/2007 | Scott et al. | 463/16 |

OTHER PUBLICATIONS

"International Application Serial No. PCT/US2008/011013, Written Opinion mailed on Dec. 8, 2008" 11 pgs.

Graupner, Tom-David, et al., "Backward simulation in food industry for facility planning and daily scheduling", *16th European Simulation Conference*, (2004), 1-6.

Kaus, Boris, et al., "Forward and Reverse Modeling of the Three-Dimensional Viscous Rayleigh-Taylor Instability", *Geophysical Research Letters*, (2000), 1-4.

Lee, Young Hae, et al., "Single run optimization using the reverse-simulation method", *Proceedings of the 1997 Winter Simulation Conference*, (1997), 1-7.

Ohkawa, Takenao, et al., "Backward Qualitative Simulation of Structural Model for Strategy Planning", *QR '96 Workshop Program*, (1996), 1-7.

"International Application Serial No. PCT/US2008/011013, International Preliminary Report on Patentability mailed Sep. 7, 2010", 23 pgs.

* cited by examiner

WAGERING GAME MACHINE OPERATIONAL SIMULATION

RELATED APPLICATION

This patent application is a U.S. National Stage Filing under 35 U.S.C. 371 from International Patent Application Serial No. PCT/US2008/011013, filed Sep. 23, 2008, and published on Apr. 9, 2009, as WO 2009/045288 A1, which claims the priority benefit of U.S. Provisional Patent Application Ser. No. 60/976,053 filed Sep. 28, 2007 and entitled "WAGERING GAME MACHINE OPERATIONAL SIMULATION", the contents of which are incorporated herein by reference in their entirety.

FIELD

The embodiments disclosed herein relate generally to wagering game machines, including the simulation of wagering game operations.

LIMITED COPYRIGHT WAIVER

A portion of the disclosure of this patent document contains material to which the claim of copyright protection is made. The copyright owner has no objection to the facsimile reproduction by any person of the patent document or the patent disclosure as it appears in the U.S. Patent and Trademark Office file or records, but reserves all other rights whatsoever. Copyright 2007, 2008 WMS Gaming Inc. All Rights Reserved.

BACKGROUND

Wagering game machine makers provide new and entertaining games on a continuous basis. One way of increasing the entertainment value associated with casino-style wagering games (e.g., video slots, video poker, video black jack, and the like) includes offering a variety of base games and bonus events. The outcome of these base games and bonus events often determines, in part, the allocation of winnings to game players, and profits distributed to the machine owners.

SUMMARY OF THE INVENTION

According to one aspect of the present invention, a computer-implemented method of conducting a wagering game receives an indication of a wager from a player to initiate the wagering game and randomly selects a statistical outcome of the wagering game. The method also receives an original input value from the player and, prior to displaying the selected statistical outcome to the player, a simulation of the wagering game is conducted from the original player input value to a resulting first simulated outcome. If the first simulated outcome does not match the selected statistical outcome, a game parameter or the original player input is modified such that a second simulated outcome matches the selected statistical outcome, and at least a portion of a second simulation based on the modified player value is displayed to the player.

According to another aspect of the invention, a computer-implemented method of conducting a wagering game receives an indication of a wager from a player to initiate the wagering game and randomly selects a statistical outcome of the wagering game. The method also receives an original input value from the player and, prior to displaying the selected statistical outcome to the player, a first simulation of the wagering game is conducted from the original player input value to a resulting first simulated outcome. If the first simulated outcome does not match the selected statistical outcome, an intermediate-time game parameter is modified such that a second simulated outcome matches the selected statistical outcome, and at least a portion of a second simulation based on the modified player value is displayed to the player.

According to another aspect of the invention, a computer-implemented method of conducting a wagering game receives an indication of a wager from a player to initiate the wagering game and randomly selects a statistical outcome of the wagering game. The method also receives an original input value from the player and, prior to displaying the selected statistical outcome to the player, a first simulation of the wagering game is conducted in reverse from the selected statistical outcome to determine a modified value set corresponding to the selected statistical outcome. The method further includes modifying another value set corresponding to the original player input value such that the another value set matches the modified value set, and at least a portion of a second simulation of the wagering game running forward based on the modified player value is displayed to the player.

Additional aspects of the invention will be apparent to those of ordinary skill in the art in view of the detailed description of various embodiments, which is made with reference to the drawings.

DETAILED DESCRIPTION

The inventors have discovered that simulating game machine operations, in both forward and reverse directions with respect to time, can provide increased variety and interest for wagering game players. Thus, various embodiments of the invention provide a number of mechanisms for the simulation of wagering game operations to determine whether a combination of conditions that are present at the time player input is received, or that exist as the game unfolds, will lead to a randomly selected statistical outcome. If it is determined that simulation based on the original conditions does not lead to the selected statistical outcome, then conditions can be modified so that the resulting modified outcome substantially matches the selected statistical outcome. Similarly, desired values for modified conditions may be determined via reverse simulation using the selected statistical outcome as a starting point.

Example Wagering Game Machine

Figure 1:
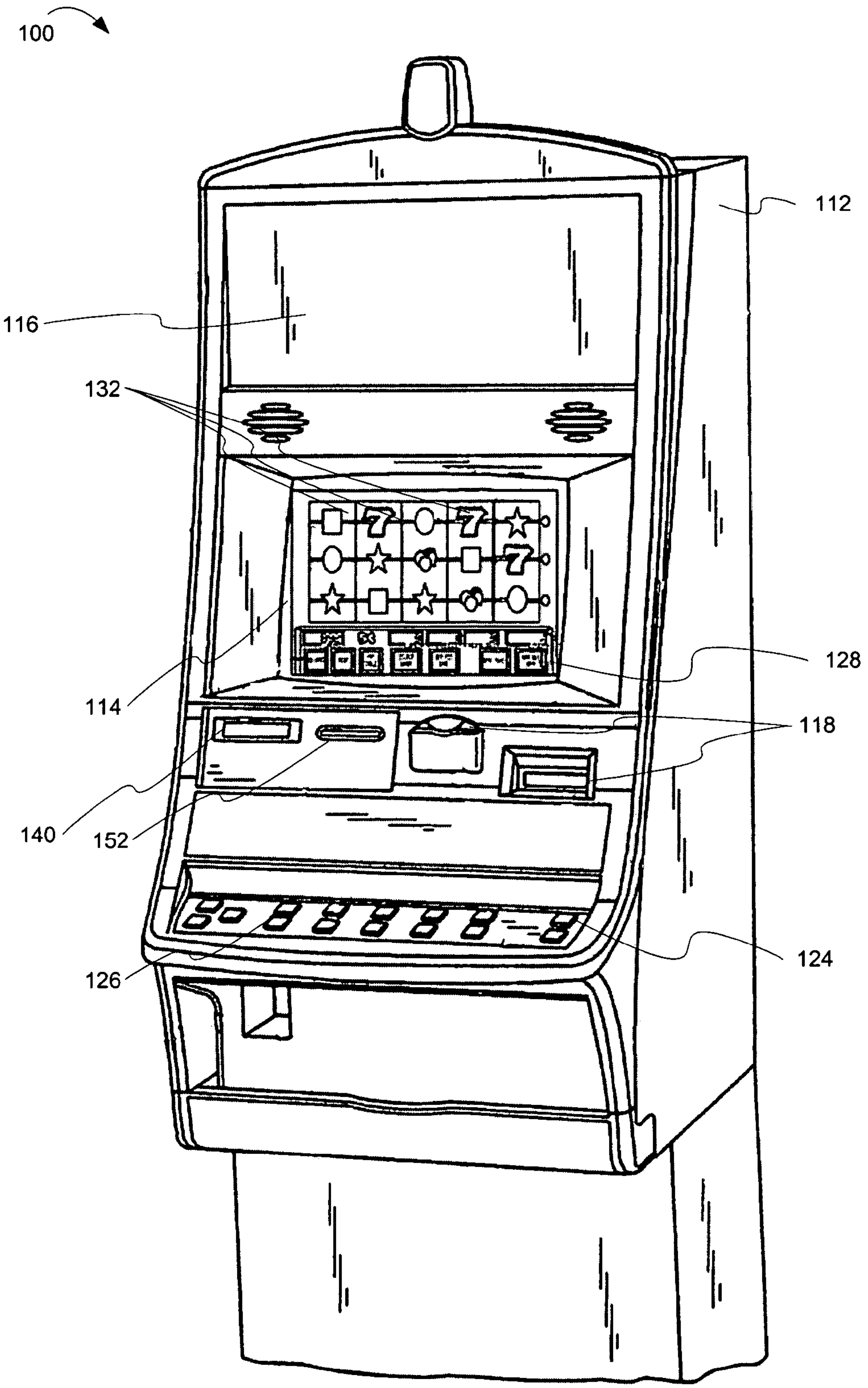
FIG. 1 is a perspective view of a wagering game machine, according to various embodiments of the invention.

FIG. 1 is a perspective view of a wagering game machine 100, according to various embodiments of the invention. The wagering game machine 100 is used in gaming establishments, such as casinos, and may be any type of wagering game machine with varying structures and methods of operation. For example, the wagering game machine 100 may comprise an electromechanical wagering game machine configured to play mechanical slots, and/or it may comprise an electronic wagering game machine configured to play video casino games, such as blackjack, slots, keno, poker, blackjack, roulette, etc.

The wagering game machine 100 comprises a housing 112 and includes input devices, including value input devices 118 and one or more player input devices 124. The player input device 124 is used to acquire player input, often in the form of some relative value (e.g., a button selection, a joystick angular displacement, a pressure transducer measurement, etc.).

For output, the wagering game machine 100 includes a primary display 114 for displaying information about a basic wagering game. The primary display 114 can also display information about a bonus wagering game and a progressive wagering game. The wagering game machine 100 also includes a secondary display 116 for displaying wagering game events, wagering game outcomes, and/or signage information. While some components of the wagering game machine 100 are described herein, numerous other elements can exist and can be used in any number or combination to create varying forms of the wagering game machine 100.

The value input devices 118 can take any suitable form and can be located on the front of the housing 112. The value input devices 118 can receive currency and/or credits inserted by a player. The value input devices 118 can include coin acceptors for receiving coin currency and bill acceptors for receiving paper currency. Furthermore, the value input devices 118 can include ticket readers or barcode scanners for reading information stored on vouchers, smart cards, or other tangible portable storage devices. The vouchers and cards can authorize access to central accounts, which can transfer money to the wagering game machine 100. The wagering game machine 100 may also include a payoff mechanism 140, such as a ticket printer and/or an outlet for currency.

The player input device 124 as shown in FIG. 1 comprises a plurality of push buttons on a button panel 126 for operating the wagering game machine 100. In addition, or alternatively, the player input device 124 can comprise a touch screen 128 mounted over the primary display 114 and/or secondary display 116. Many other devices can be included in the machine 100, and used to provide values of player input.

The various components of the wagering game machine 100 can be connected directly to, or contained within, the housing 112. Alternatively, some of the wagering game machine's components can be located outside of the housing 112, while being communicatively coupled with the wagering game machine 100 using any suitable wired or wireless communication technology.

The operation of the basic wagering game can be displayed to the player on the primary display 114. The primary display 114 can also display a bonus game associated with the basic wagering game. The primary display 114 can include a cathode ray tube (CRT), a high resolution liquid crystal display (LCD), a plasma display, light emitting diodes (LEDs), or any other type of display suitable for use in the wagering game machine 100. Alternatively, the primary display 114 can include a number of actual or simulated mechanical reels to display the outcome. In FIG. 1, the wagering game machine 100 is shown as an "upright" version in which the primary display 114 is oriented vertically relative to the player. Alternatively, the wagering game machine 100 can take the form of a "slant-top" version in which the primary display 114 is slanted at about a thirty-degree angle toward the player of the wagering game machine 100. In yet another embodiment, the wagering game machine 100 can exhibit any suitable form factor, such as a free standing model, bartop model, mobile handheld model, multi-player model (e.g., see element 200 of FIG. 2), or workstation console model. Further, in some embodiments, the wagering game machine 100 may include an attached chair assembly, and may include audio speakers designed to provide an enhanced audio environment. For example, a "surround sound" system may be included as part of the wagering game machine 100 and may be integrated with the attached chair.

A player begins playing a basic wagering game by making a wager via the value input device 118. The player can initiate play by using buttons or other actuation mechanisms of the player input device 124, including the touch screen 128. The basic game can include arranging a plurality of symbols along a payline 132, which indicates one or more outcomes of the basic game. Such outcomes can be randomly selected (e.g., as a randomly selected statistical outcome) in response to player input. At least one of the outcomes, which can include any variation or combination of symbols, can trigger a bonus game.

In some embodiments, the wagering game machine 100 includes an information reader 152, which can include a card reader, ticket reader, bar code scanner, radio frequency identification (RFID) transceiver, or computer readable storage medium interface. In some embodiments, the information reader 152 can be used to award complimentary services, restore game assets, track player habits, etc.

In some embodiments, the player-accessible value input device 118 of the wagering game machine 100 may be accompanied by a player information reader 152 that allows for identification of a player by reading a card with information indicating the player's identity (e.g., reading a player's credit card, player ID card, smart card, etc.). The player information reader 152 can alternatively or in addition comprise a bar code scanner, RFID transceiver or computer readable storage medium interface.

The player information reader 152 may also comprise or utilize a biometric player information reader which permits the player to access available funds in a player's account, either alone or in combination with another of the aforementioned player-accessible value input devices 118. In an embodiment wherein the player-accessible value input device 118 comprises or is used in conjunction with a biometric player information reader 152, transactions such as an input of value to the wagering game machine 100, a transfer of value from one player account or source to an account associated with the wagering game machine 100, or the execution of another transaction, for example, could all be authorized by a biometric reading, which may comprise a plurality of biometric readings, from the biometric device.

In some embodiments, the wagering game machine 100 can form part of a portable wireless communication device, such as a personal digital assistant (PDA), a laptop or portable computer with wireless communication capability, a web tablet, a wireless telephone, a wireless headset, a pager, an instant messaging device, a digital camera, a television, or other device that has a display and can receive and/or transmit information wirelessly.

Example Wagering Game Machine System

Figure 2:
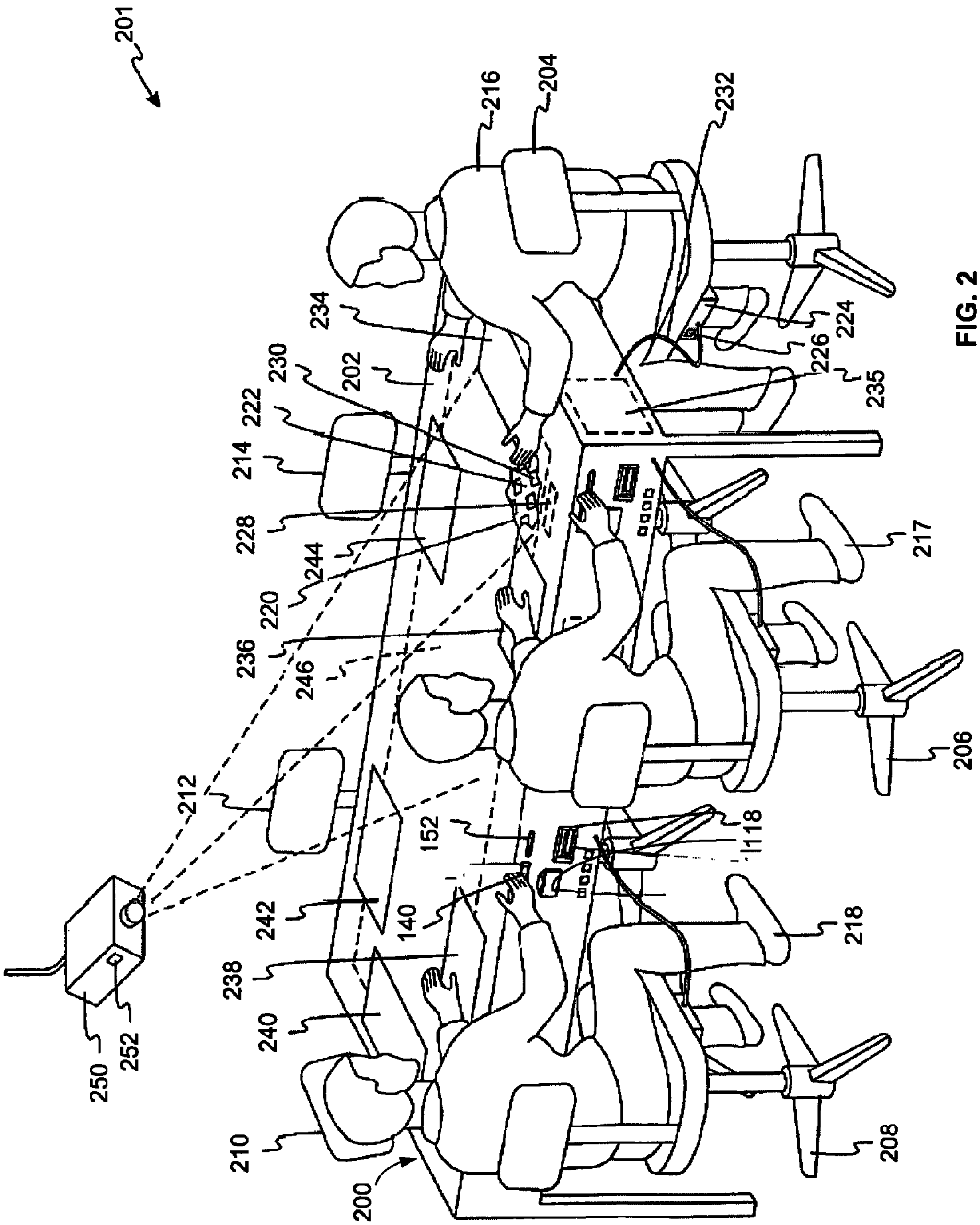
FIG. 2 is a perspective view of a multi-touch, multi-player wagering game machine forming part of a system according to various embodiments of the invention.

FIG. 2 is a perspective view of a multi-touch, multi-player wagering game machine 200 forming part of a system 201 according to various embodiments of the invention. The machine 200 includes a display surface 202 which in this case is positioned substantially horizontally relative to ground and is a table around which game players may be seated. The display surface 202 may also be mounted in a vertical position or in a slanted position relative to the game players. In this aspect, the machine 200 preferably includes a number of player chairs 204, 206, 208, 210, 212 and 214 for the game players. In another aspect, the machine 200 does not include chairs and allows players to stand, such as to play a virtual craps wagering game. The display surface 202 includes different player regions 234, 236, 238, 240, 242 and 244 as well as a common region 246. In this aspect, each of the player regions 234, 236, 238, 240, 242 and 244 include a multi-point sensing device which senses the presence of a multi-point contact by a player anywhere in that region.

Alternately, there may be one multi-point sensing device that optionally senses contacts or gestures by the players 216, 217, 218 located around the display surface 202 whose contacts or gestures can be differentiated via player identification devices that may be coupled to the chairs 204, 206, 208, 210, 212 and 214 as described in more detail below. In some embodiments, player regions are created in software, which partitions the display surface into distinct regions. The common region 246 also has a common region multi-point sensing device to sense multi-point contact anywhere in the common region 246.

Elements of the gaming system 201 which are identical to those of the gaming machine 100 shown in FIG. 1 are labeled with identical reference numbers. Of course, those of ordinary skill in the art will realize that the machine 200 can include any or all of the elements of machine 100. The system 201 allows the playing of multi-player games as will be explained below by players such as players 216, 217, 218. The display surface 202 is in sufficient proximity to the players to allow contact of the display surface 202 by the players. The display surface 202 may be mounted on a swivel and rotated in order to change the orientation of the display surface 202 relative to the players.

The player regions 234, 236, 238, 240, 242 and 244 may be implemented by a multi-wire touchscreen such as the one offered by GM Nameplate described below. Each zone or region defined relative to the touchscreen is assigned to each player. When a player touches or gestures in the zone or region assigned to that player, a controller 235 distinguishes inputs from that zone from inputs from other zones. This aspect of the illustrated embodiment does not require sensors in the chairs to distinguish among touches. On the other hand, the zones in some embodiments cannot be modified, so each player should contact the display surface within the assigned zone.

The machine 200 may recognize single contacts and associate such contacts with a particular player. Contact with the display surface 202 by any of the players may be sensed by a contact sensing device 220 positioned adjacent to the display surface 202. The contact sensing device 220 includes an array of antennas 222. Each of the antennas in the array 222 are positioned under the display surface 202 and emit a positional signal indicative of the position of the contact on the display surface 202. An example of a suitable contact sensing device may be the Diamond Touch Table offered by Mitsubishi Electric Research Laboratories.

As with the gaming machine 100, the gaming machine 200 has one or more value input devices 118 for receiving a wager associated with a wagering game. The wagering game is displayed on the display surface 202. The display surface 202 also displays the randomly selected statistical outcome or outcomes generated as party of the wagering game. The controller 235 may be coupled to the display surface 202 to cause graphics to be generated on the display surface 202. The controller 235 may be programmed to execute a wagering-game function associated with contact data from the players and, as will be explained below, associates the wagering-game function with an individual player based on the contact data. The controller 235 may also recognize the specific identity of the player via information taken from the player information obtained via the player information reader 152. In this manner, the controller 235 may provide additional functionality to a specific player based on their contact with the table and previous gaming data.

In this example, a player identification device 224 in the chair 204 includes a receiver 226 that is capacitively coupled to the respective player 216. The receiver 226 is in communication with the controller 235. The receiver 226 receives signals transmitted from a transmitter array 228 to an antenna 230 in the antenna array 222 under the display surface 202 via a contact by the player 216 sitting in the chair 204. When the player 216 touches the display surface 202, a position signal is sent from the antenna 230 through the body of the player 216 to the receiver 226. The receiver 226 may send a signal to the controller 235 indicating the player 216 sitting in the chair 204 has contacted the display surface 202 and the position of the contact. In this example, the receiver 226 communicates with the controller 235 via a control cable 232. Those of ordinary skill in the art will understand that a wireless connection may be used instead of the control cable 232 by including a wireless interface on the receivers and controller 235.

The controller 235 can associate the contact input with the chair 204 and hence the player 216. The controller 235 can execute the appropriate function according to the wagering game such as changing the graphics displayed on some or all of the display surface 202. The controller 235 may also execute other game actions, such as selecting a payline, increasing or decreasing an amount to wager per payline, increasing or decreasing a potential bonus award, selecting a bonus award amount, selecting numbers in a keno-type or roulette-type wagering game, requesting a hold for one or more cards, inputting a wager amount, selecting a wager amount, selection of number of reels, selection of cards, an instruction to deal another card, a request to be dealt another card, a request to not be dealt another card, a cash-out request, and the like.

Of course it is to be understood that the chairs 204-214 and associated receivers 226 could be replaced with a player-carried device such as a wrist strap, headset or waist pack in which case a player may stand on a conductive floor plate in proximity to the display surface 202. The display surface 202 may include different player regions 234, 236, 238, 240, 242 and 244 as well as a common region 246 to assist players in their interaction with the wagering game. However, since the controller 235 can recognize each player, the contacts of a player anywhere within the display surface 202 including another player region will be associated with the player. Players can "individualize" their region 234, 236, 238, 240, 242 and 244 by writing their name with their finger on the display surface 202.

The antenna array 222 may be used in conjunction with any of the multipoint contact sensors described above to provide greater sensing of movement, pressure, gestures, etc. The antenna array 222 may also be used with a haptic device to provide tactile feedback to a player.

As shown in FIG. 2, graphics are projected on the display surface 202 via a digital light processor (DLP) projector 250 that is suspended at a set distance in relation to the display surface 202. The DLP projector 250 has a graphics input 252 which is in communication with the controller 235 to generate graphics for projection on the display surface 202. Alternately, the graphics may also be projected on the display surface 202 via a backlit projector or via a liquid crystal display. The controller 235 may be programmed to change the graphic on the display surface 202 in response to the contact data received from the receivers.

Figure 3:
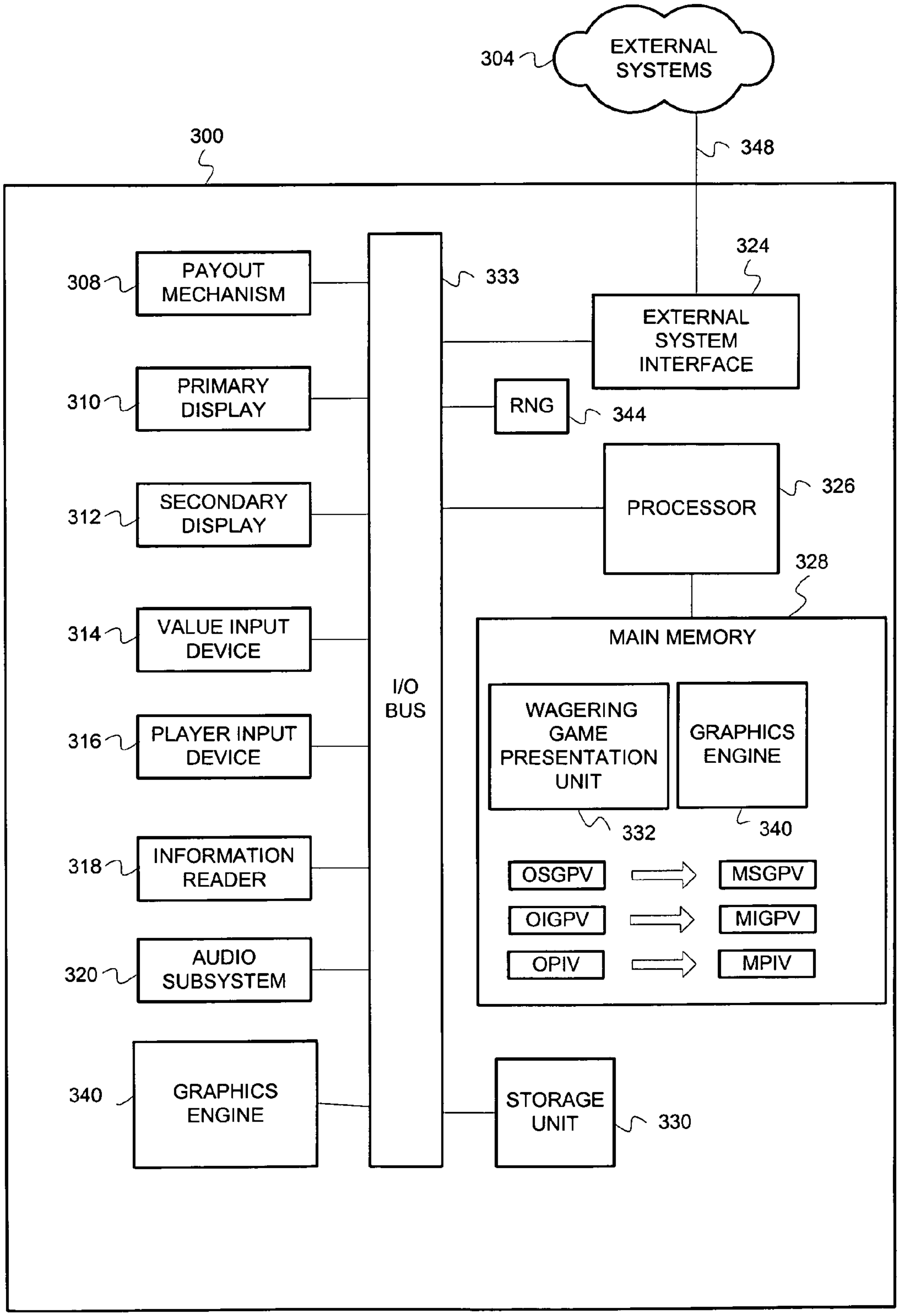
FIG. 3 is a block diagram of a wagering game machine architecture according to various embodiments of the invention.

FIG. 3 is a block diagram of a wagering game machine architecture 300 according to various embodiments of the invention. Any part or all of the architecture 300 may be included in the wagering game machines 100 and 200 of FIGS. 1 and 2, respectively. As shown in FIG. 3, the architecture 300 includes a processor 326 connected to main memory 328, which may a wagering game presentation unit 332 and rendering engine 340. In one embodiment, the wagering game presentation unit 332 can operate to present wagering games, such as video poker, video black jack, video slots, video lottery, etc., in whole or in part.

The graphics engine 340 includes components that may be used to provide real-time three-dimensional rendering of a multi-dimensional space based on input data. The multi-dimensional space can represent a portion of the wagering game environment, whether it is ultimately displayed to the player or not. Various graphics engines are known in the art and may be used in various embodiments of the invention. In some embodiments, the graphics engine comprises a RenderWare graphics engine, available from Criterion Software. As shown on FIG. 3, graphics engine 340 may be implemented in software, hardware, or a combination of software and hardware.

In some embodiments, graphics engine 340 includes a set of one or more components that provides real-time three-dimensional computer graphics for a wagering game application or other software running on a wagering game machine. Graphics engine 340 may also be referred to as a game engine. In some embodiments, graphics engine 340 provides an underlying set of technologies in an operating system independent manner so that a wagering game may be easily adapted to run on multiple platforms, including various hardware platforms such as stand-alone and portable wagering game machines and various software platforms such as Linux®, UNIX®, Mac OS® X and Microsoft® Windows® families of operating systems. In some embodiments, graphics engine 340 may include various combinations of one or more components such as a rendering engine ("renderer") for two-dimensional or three-dimensional graphics, a physics engine and/or components providing collision detection, sound, scripting, animation, artificial intelligence, networking, and scene graphs. A scene graph is generally considered to be an object-oriented representation of a three-dimensional game world and is designed for efficient rendering of vast virtual worlds. Thus in various embodiments, a real-time rendering of a three-dimensional model such as a scene graph is provided for a wagering game application or other software operating on a wagering game machine. Further, while shown as part of an architecture 300 for a wagering game machine, graphics engine 340 or portions thereof may reside on systems external to the wagering game machine, such as on a game server.

The processor 326 is also connected to an I/O bus 322, which facilitates communication between the wagering game machine's components. The I/O bus 322 may be connected to a payout mechanism 308, primary display 310, secondary display 312, value input device 314, player input device 316, information reader 318, and/or storage unit 330. The player input device 316 can include the value input device 314 to the extent the player input device 316 is used to place wagers. The I/O bus 322 may also be connected to an external system interface 324, which in turn can be connected to external systems 304 (e.g., wagering game networks), perhaps via wired or wireless communication links 348.

Some embodiments of the invention include an audio subsystem 320. Audio subsystem 320 provides audio capabilities to the wagering game machine and may comprise an audio amplifier coupled to speakers or an audio jack, and may further include an audio programming source on a memory such as a CD, DVD, flash memory etc.

In one embodiment, the wagering game machine architecture 300 can include additional peripheral devices and/or more than one of each component shown in FIG. 3. For example, in one embodiment, the wagering game machine architecture 300 can include multiple external system interfaces 324 and multiple processors 326. In one embodiment, any of the components can be integrated or subdivided. Additionally, in one embodiment, the components of the wagering game machine architecture 300 can be interconnected according to any suitable interconnection architecture (e.g., directly connected, serially connected, star connection, hypercube, etc.).

In one embodiment, any of the components of the wagering game machine architecture 300 (e.g., the wagering game presentation unit 332) can include hardware, firmware, and/or software for performing the operations described herein. Machine-readable media includes any mechanism that provides (i.e., stores and/or transmits) information in a form readable by a machine (e.g., a wagering game machine, computer, etc.). For example, tangible machine-readable media includes read only memory (ROM), random access memory (RAM), magnetic disk storage media, optical storage media, flash memory drives, etc. Machine-readable media also includes any media suitable for transmitting software over a network.

In operation, a player may use components of the wagering game machine architecture 300 to activate play of a wagering game on the machine. Using the available input mechanisms such as value input device 314 or devices coupled through player input device 316, the player may select any variables associated with the wagering game and place his/her wager to purchase a play of the game. During game play, the processor 326 generates at least one random event using a random number generator (RNG) 344 that provides a randomly selected statistical outcome and provides an award to the player for a winning outcome of the random event. Alternatively, the random event may be generated by a remote computer using the RNG 344 or pooling schema and then transmitted to the wagering game machine. The processor 326 operates the display 114 to represent the randomly selected statistical outcome as an event in a visual form that can be understood by the player. In some embodiments, a wagering game segment may be triggered based on certain events. For example, a bonus round may be triggered.

As mentioned previously, various embodiments may use simulation to determine whether a combination of conditions will lead to a randomly selected statistical outcome. Simulations can be run in a forward direction (as time increases), as well as in a reverse direction (with time going backward). In most embodiments, the processor(s) 326 have the ability to run simulations associated with the wagering game presented by the architecture 300 in either direction.

Those of ordinary skill in the simulation art are familiar with the use of forward and reverse simulation. Readers that desire to learn more about simulation in the forward and reverse directions (i.e., backward simulation) are encouraged to consult the following references: Backward Qualitative Simulation of Structural Model for Strategy Planning, Takenao Ohkawa et al., Tenth International Workshop on Qualitative Reasoning (QR-96), AAAI Press, 1996; Backward Simulation in Food Industry for Facility Planning and Daily Scheduling, Graupner et al., 16th European Simulation Symposium [ESS 2004], Budapest, Hungary, 2004; and United States Patent Publication Number 2006/0101383, incorporated herein by reference in its entirety.

Thus, simulations may be run in a forward direction, a reverse direction, or both, depending on the design of a particular embodiment. Input values to a forward simulation may include an original starting game parameter value OSGPV, an original intermediate-time game parameter value OIGPV, and an original player input value OPIV. Modified versions of any or all of these values may also be used. Input values to a reverse simulation may also include original starting game parameter value(s) OSGPV, original intermediate-time game parameter value(s) OIGPV, and original player input value(s) OIPV, modified versions of these values, and/or a selected statistical outcome of the game.

For the purposes of this document, an "original starting game parameter" is any game parameter that is present prior to the start of a game simulation that runs in a forward direction. Examples include the size and location of bumpers on a pool table, the size and material makeup of tires on a race car, the length and configuration of a race track, the volume of a swimming pool, locations and composition of physical objects in a multi-dimensional environment, weather conditions, material composition of dice, weight of dice, orientation of dice, table friction, orientation of a roulette wheel, weight of a roulette ball, numerical layout of a roulette wheel, arrangement and number of symbols on slot machine reels, reel rotational friction, reel initial velocity, number of reels in a machine, arrangement of a card deck, stiffness of the cards, weight of bingo balls, the friction across each bingo ball, the number of bingo balls, and the cage size used to rotate the bingo balls, etc. It should be noted that any parameter that involves the weight of an object can be changed by adjusting the mass of the object, the force of gravity on the object, or both.

An "original player input value" is a value representing any input from a game player that can affect the simulated outcome of a game and that is received prior to the start of game simulation, whether in a forward or reverse direction.

An "intermediate-time game parameter" is any random or non-random game parameter having a value that can be changed as a function of time over the time period which begins after the original player input value is acquired and ends before any wagering game simulation result is determined, and that affects the simulation result if it is changed during this time period. Thus, an original player input value is neither an original starting game parameter, nor an intermediate-time game parameter.

A "random game parameter" is a game parameter that is normally changed as a result of input from a random number generator (e.g., random time sampling, random value generation). A "non-random game parameter" is a game parameter that is normally changed as a result of input from other than a random number generator (e.g., bowling alley ramp level, continuing player input, pachinko machine post location).

Thus, many embodiments may be realized. For example, an apparatus, such as either of the wagering game machines 100, 200 in FIGS. 1 and 2, respectively, may comprise an RNG 344 to determine a randomly selected statistical outcome of a wagering game upon which monetary value may be wagered, and one or more processors 326 operable to present the wagering game. The processor(s) 326 are also operable to run a simulation in reverse using the selected statistical outcome to determine at least one of a modified starting game parameter value MSGPV, a modified intermediate-time game parameter value MIGPV, and a modified player input value MPIV. The processor(s) 326 are also operable to modify one or more of an original starting game parameter value OSGPV, an original intermediate-time game parameter value OIGPV, and an original player input value OPIV to provide the modified starting game parameter value MSGPV, the modified intermediate-time game parameter value MIGPV, and the modified player input value MPIV, respectively. That is, the simulation can be run in reverse from the selected statistical outcome to determine a modified value, and then the processor(s) 326 can operate to modify original values to provide the modified values.

In most embodiments, the apparatus includes a player input device 316 operable to provide the original player input value, and a graphics engine 340 operable to control display of at least a portion of the simulation running forward. The simulation running forward may be based on one or more of the modified starting game parameter value MSGPV, the modified intermediate-time game parameter value MIGPV, and the modified player input value MPIV.

The player input device 316 may be selected from a number of devices, or a combination of devices, including a keyboard, a touch screen, a joystick, a button for receiving impacts, a wireless remote control (e.g., sword, glove, wand), dice, a slot machine lever, a roulette wheel, a roulette wheel ball, playing cards, one or more pachinko machine controls, a cellular telephone, a trackball, a camera, a gesture sensor, a microphone, a spring-loaded plunger, a button having adjustable tactile characteristics, a thumbwheel, a musical instrument, a dance pad, a head tracker, an eye tracker, and a brain wave sensor.

The RNG 344 is operable to provide a basis for modifying one or more physical properties (e.g., size, shape, density, transparency, etc.) of an object located in a multi-dimensional space, perhaps displayed as part of the simulation running forward. The RNG 344 may also be operable to modify an environmental variable (e.g., temperature, humidity, gravity, barometric pressure, etc.) associated with the multi-dimensional space, perhaps affecting the outcome of the simulation and/or physical properties of various objects.

For the purposes of this document, "physical properties" include real-world physical properties (e.g., Earth gravity and time) and non-real world physical properties (other universes, moving back and forth in time, gravity warping or repulsion instead of attraction). A "multi-dimensional space" may have 2, 3, . . . , N dimensions (e.g., time as a fourth dimension, gravity as a fifth dimension, etc.).

Figure 4:
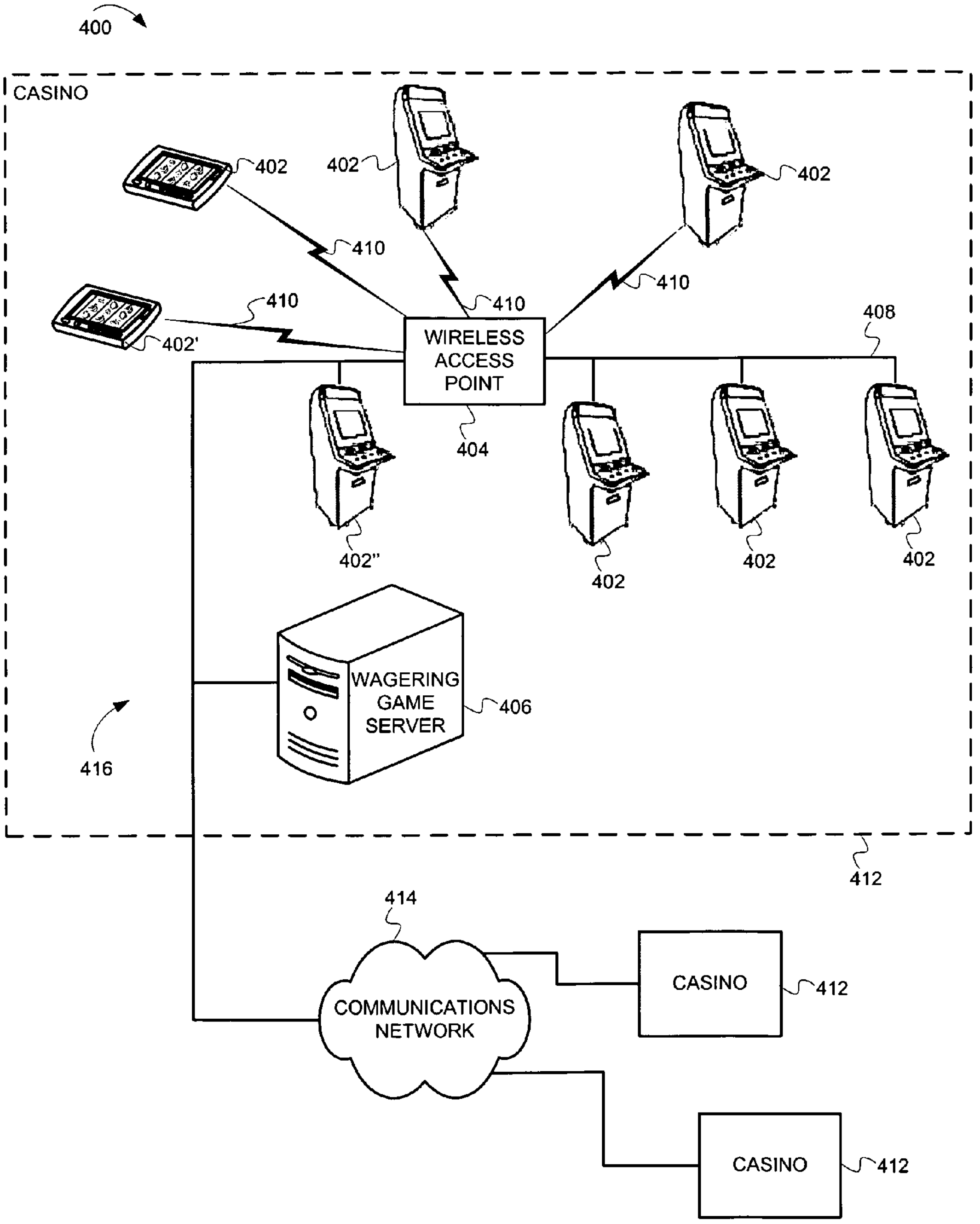
FIG. 4 is a block diagram illustrating a wagering game network, according to various embodiments of the invention.

While FIGS. 1-3 describe several embodiments of a wagering game machine and its architecture, FIG. 4 shows how a plurality of wagering game machines can be connected in a wagering game network.

Example Wagering Game Network

FIG. 4 is a block diagram illustrating a wagering game network 400, according to various embodiments of the invention. As shown in FIG. 4, the wagering game network 400 includes a plurality of casinos 412 connected to a communications network 414.

Each of the plurality of casinos 412 includes a local area network 416, which may include a wireless access point 404, wagering game machines 402, and a wagering game server 406 that can serve wagering games over the local area network 416. The wagering game machines 402 may be similar to or identical to the wagering game machines 100, 200 shown in FIGS. 1 and 2, respectively.

As such, the local area network 416 includes wireless communication links 410 and wired communication links 408. The wired and wireless communication links can employ any suitable connection technology, such as Bluetooth, 802.11, Ethernet, public switched telephone networks, SONET, etc. In one embodiment, the wagering game server 406 can serve wagering games and/or distribute content to devices located in other casinos 412 or at other locations on the communications network 414. The wagering game machines 402 and wagering game server 406 can include hardware and machine-readable media including instructions for performing the operations described herein.

The wagering game machines 402 described herein can take any suitable form, such as floor standing models, handheld mobile units, bartop models, workstation-type console models, electronic tables, including multi-touch and multiplayer tables, etc. Further, the wagering game machines 402 can be primarily dedicated for use in conducting wagering games, or can include non-dedicated devices, such as mobile phones, personal digital assistants, personal computers, etc. In one embodiment, the wagering game network 400 can include other network devices, such as accounting servers, wide area progressive servers, and player tracking servers.

In various embodiments, wagering game machines 402 and wagering game servers 406 work together such that a wagering game machine 402 may be operated as a thin, thick, or intermediate client. For example, one or more elements of game play may be controlled by the wagering game machine 402 (client) or the wagering game server 406 (server). Game play elements may include executable game code, lookup tables, configuration files, game outcome, audio or visual representations of the game, game assets or the like. In a thin-client example, the wagering game server 406 may perform functions such as determining game outcome or managing assets, while the wagering game machine 402 may be used merely to present the graphical representation of such outcome or asset modification to the user (e.g., player). In a thick-client example, game outcome may be determined locally (e.g., at the wagering game machine 402) and then communicated to the wagering game server 406 for recording or managing a player's account.

Similarly, functionality not directly related to game play may be controlled by the wagering game machine 402 (client) or the wagering game server 406 (server) in some embodiments. For example, power conservation controls that manage a display screen's light intensity may be managed centrally (e.g., by the wagering game server 406) or locally (e.g., by the wagering game machine 402). Other functionality not directly related to game play may include presentation of advertising, software or firmware updates, system quality or security checks, etc.

Thus, many more embodiments may be realized. For example a system (e.g., wagering game network 400) may comprise a plurality of wagering game machines 402 with interactive player input devices. More specifically, a system may comprise a first wagering game machine 402' that includes an RNG, one or more processors, and a graphics generator as described above with respect to the architecture 300 in FIG. 3. In addition, the system may comprise a second wagering game machine 402" including a player input device to provide an original player input value. That is, the second wagering game machine 402" includes a player input device to provide the original player input value to the first wagering game machine 402'. In this way, a player at one game machine 402" can interactively provide input to another game machine 402'.

In some embodiments, the system may comprise a wagering game machine server 406 to couple to the first and the second wagering game machines 402', 402", and to present a progressive gaming environment based on the selected statistical outcome. In addition to the player input device of the second wagering game machine 402", the system may comprise several other player input devices that can be coupled to the first and the second wagering game machines 402', 402". In this case, the original player input value might be provided by a combination of the player input device coupled to the second wagering game machine 402" and one or more of the other player input devices coupled to the first wagering game machine 402'.

Figure 5A:
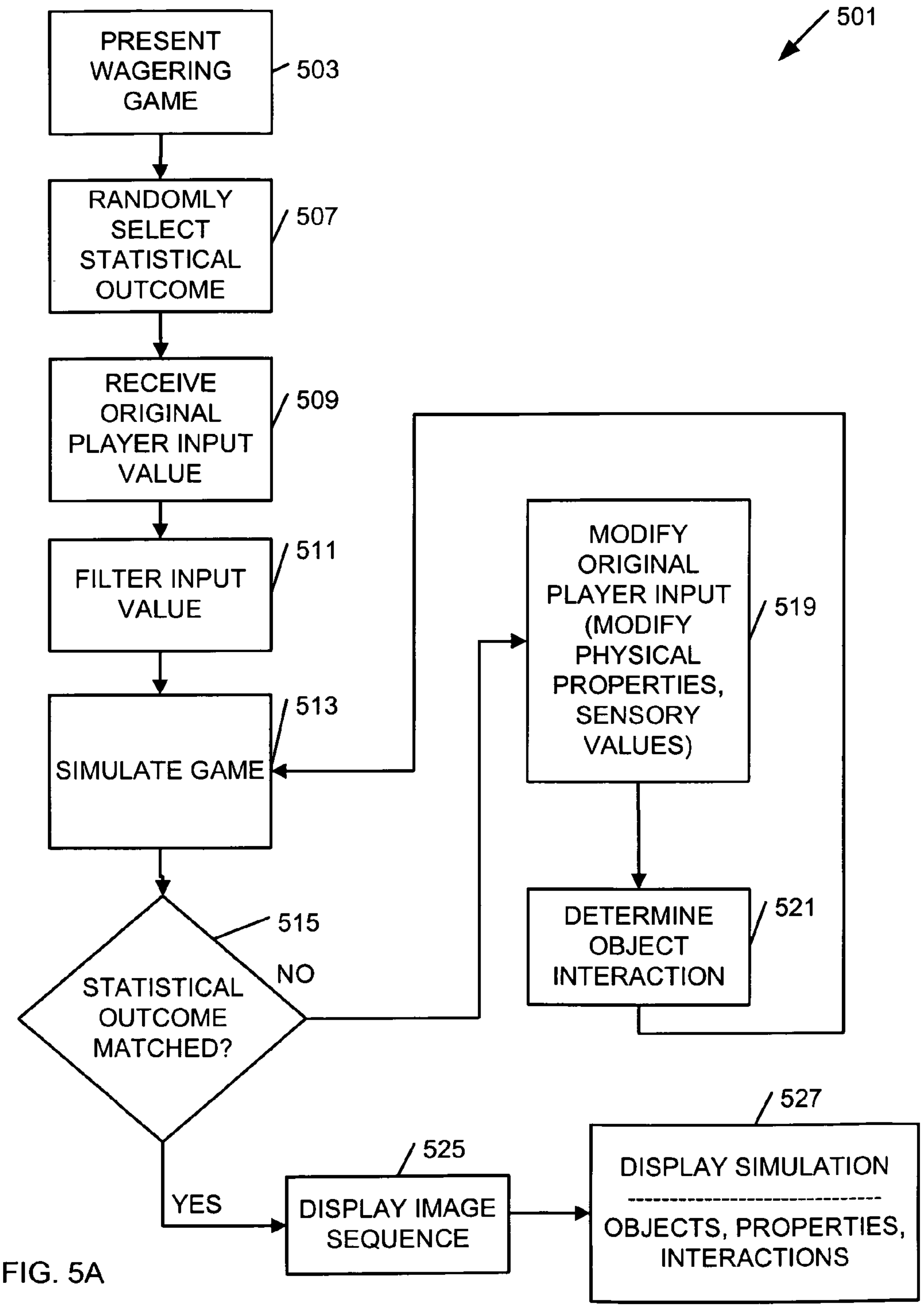
FIGS. 5A-5C are flow diagrams illustrating methods of simulating wagering game operations according to various embodiments of the invention.
Figure 5B:
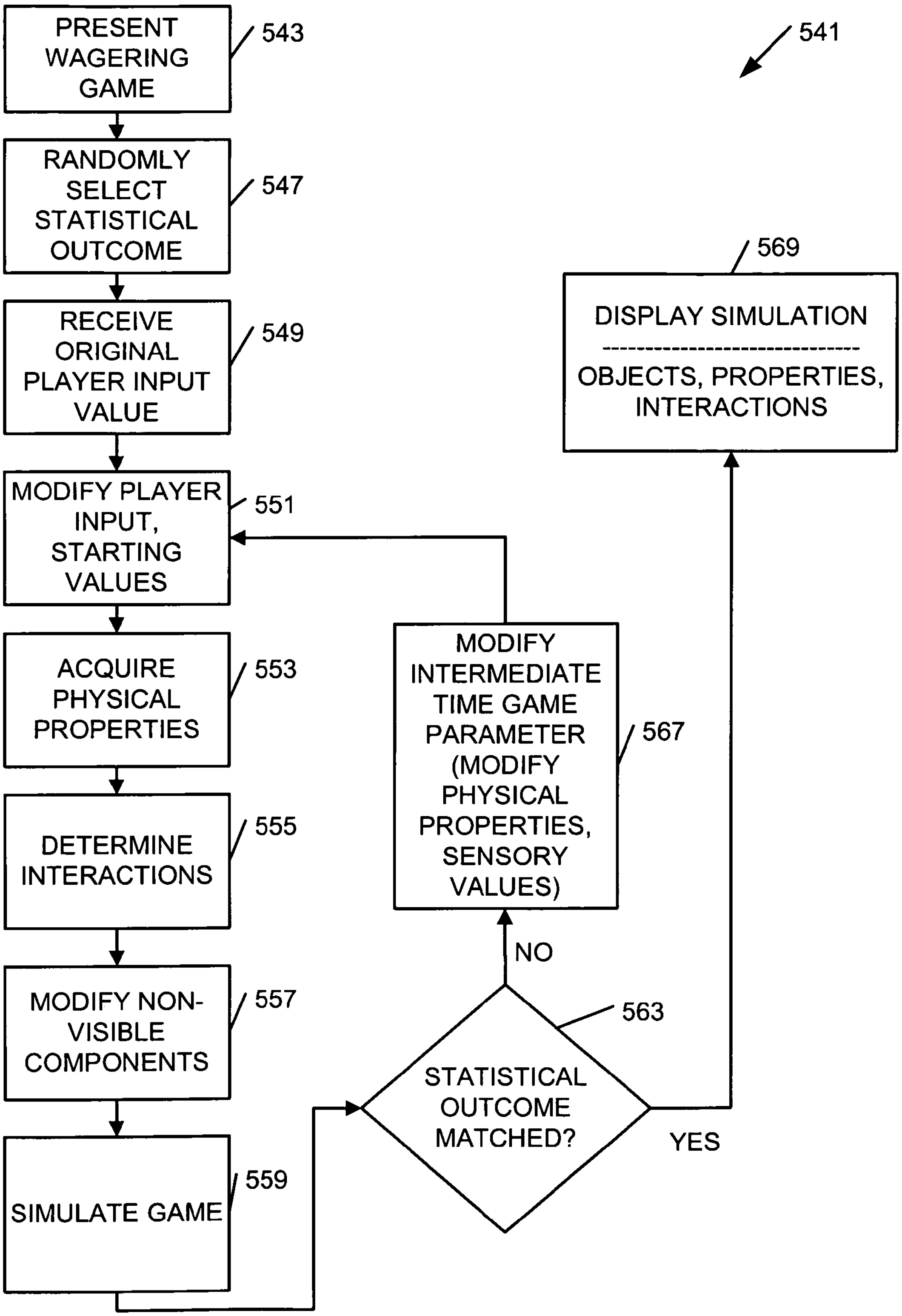
Figure 5C:
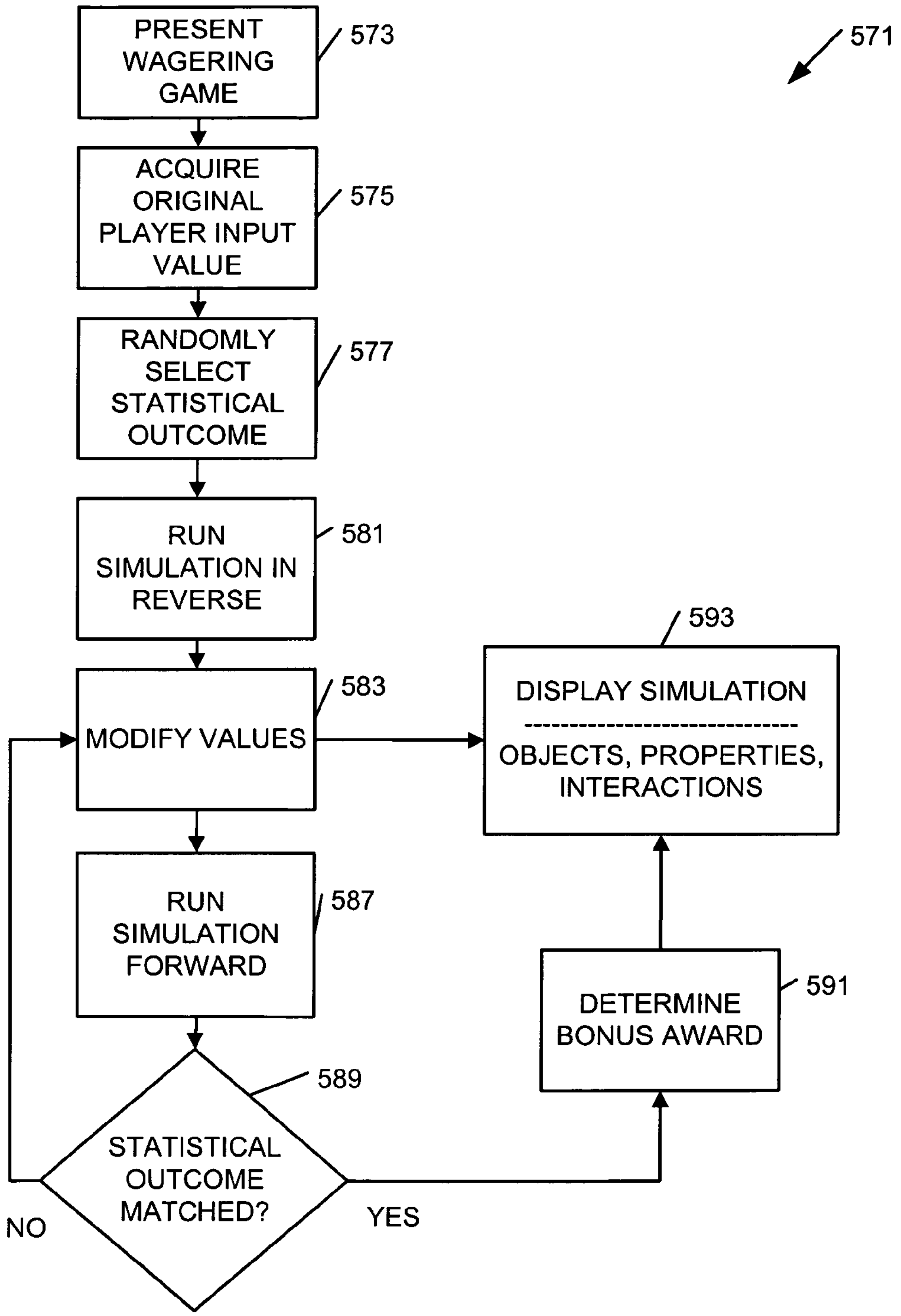

FIGS. 5A-5C are flow diagrams illustrating methods of simulating wagering game operations according to various embodiments of the invention. The methods may include the presentation of a wagering game using the wagering game machine 100, the wagering game machine 200, or the wagering game machines 402 (see FIGS. 1, 2, and 4, respectively). The methods to be performed may utilize computer programs made up of computer-executable instructions. Describing the methods by reference to a flowchart enables one of ordinary skill in the art to develop such programs including instructions to carry out the method on suitable processors for gaming machines (the processor or processors of the computer executing the instructions from computer-readable media). The methods illustrated in FIGS. 5A-5C includes acts that may be taken by an operating environment executing any embodiment of the invention.

Turning now to FIG. 5A, it can be seen that in some embodiments, a method 501 that operates to achieve a selected statistical outcome by modifying a wagering game player input begins at block 503 by presenting a wagering game upon which monetary value may be wagered. The method 501 may continue on to block 507 with randomly selecting a statistical outcome of the wagering game. In some embodiments, after receiving the original player input value at block 509, the original player input value is filtered at block 511 to exclude values less than or greater than a preselected threshold (e.g., a joystick movement that is too slow to be effective in a particular game is ignored). In most embodiments, the method 501 includes conducting a simulation of the wagering game at block 513 in response to receiving an original player input value at block 509.

If it is determined that an initial result of the simulation substantially matches the selected statistical outcome at block 515, the method 501 may continue on to displaying at least a portion of the simulation based on the original player input value at block 527.

If it is determined that an initial result of the simulation does not substantially match the selected statistical outcome at block 515, the method 501 may continue on to modifying the original player input value to provide a modified player input value at block 519 so that conducting the simulation based on the modified player input value yields a modified result that substantially matches the selected statistical outcome at block 515. Either the original player input value or the modified player input value may be used as the basis for modifying sensory values, such as any one or more of the sound of the wagering game, the smell of the wagering game, a taste of the wagering game, and/or a tactile sensation provided by the wagering game at block 519.

In some embodiments, the method 501 includes determining the interaction between a variety of objects. For example, the method 501 may include determining an interaction between one object and another object having different physical properties within a multi-dimensional space, perhaps after modifying the original player input value, at block 521. After optionally conducting additional simulations at block 513, and comparing a modified result of the simulation with the selected statistical outcome at block 515, the method 501 may include displaying the interaction at block 527.

In many embodiments, the images displayed as part of the simulation will include graphical objects representing targets or other objects in a multi-dimensional scene. In some embodiments, the targets may comprise bonus award amounts or bonus multipliers. In addition, the graphical objects may include graphical elements that are part of the bonus round such as airplanes, cars, or other parts of the scenes provided in a bonus round. The graphical objects may be fixed in multi-dimensional space or they may move through the multi-dimensional space.

An example of this type of operation includes a craps game where a simulation run in the forward direction, based on the original user input, results in a dice roll of 6-6. If the selected statistical outcome is actually 1-1, then the simulation can be run in the reverse direction, for example, to determine a modified player input value that results in a roll of 1-1. Another example of an original player input value might include a bat swung at a baseball using a particular speed and angle. Either the swing speed, the swing angle, or both can be modified to provide a modified player input value that gives a home-run to the left field bleachers in a baseball game as the modified result of the simulation.

Trial and error methods, as well as search-tree algorithms, can also be used to find the modified player input value for a simulation running forward that provides a modified result substantially matching the selected statistical outcome. Once this modified player input value is determined, some portion (or all) of the simulation may then be displayed to the wagering game player. This may include displaying the modified player input as part of the visible scene.

Many variations are possible. For example, the modified result of the simulation may be determined in part by physical properties attributed to an object located in a multi-dimensional space. The selected statistical outcome may be used to modify one or more of the physical properties to provide a modified physical property, and the modified physical property may then be used to provide physical property input into the simulation.

The original player input value may be associated with a player input directed to an object, and the object itself may be displayed as part of the activity in block 523. Physical properties of the object, as well as modified physical properties, may also be displayed as part of the activity in block 527.

In some embodiments, the method 501 includes displaying a preselected animated image sequence at block 525 prior to displaying some portion of the simulation at block 527. In this case, the animation images are shown prior to the simulation images, either as part of the action leading up to the simulation, or perhaps taken from a preselected, stored bank of animation sequences. The preselected animated image sequence may include animated player input activity based on a modified player input value. Thus, a modified form of the player input activity may be displayed to the player in block 525. The method 501 may conclude with displaying at least a portion of the simulation based on the modified player input value at block 527.

Turning now to FIG. 5B, it can be seen that in some embodiments, a method 541 that operates to achieve a selected statistical outcome by modifying one or more intermediate-time wagering game parameters begins at block 543 by presenting a wagering game upon which monetary value may be wagered. The method 541 may continue at block 547 with randomly selecting a statistical outcome of the wagering game, and then on to block 549 with receiving an original player input value.

The method 541 may continue on to block 551 with modifying at least one of starting game parameter values and the player input value based on a selected statistical outcome to provide a modified feature, wherein the modified feature is used to provide feature input into a simulation (see block 559). The method 541 may continue on to block 553 with determining or acquiring physical properties of various objects. Such objects may include representations of humans, animals, vehicles, targets, and game-playing pieces, among others. Physical properties can include mass, life-span, motion, density, hardness, chemical composition, and volume, among others. Motion can include velocity and acceleration. Other physical properties may include friction, viscosity, spring constant, internal pressure (e.g., of a tire or balloon), gravity, surface shape (e.g., a ramp in a bowling alley), temperature, gas pressure (e.g., atmospheric, blood, tank, etc.), conductivity, power, entropy, and permeability.

The method 541 may include determining interactions between a selected object and other objects at block 555, such as a fluid forming a portion of the multi-dimensional space. This determined interaction may later be displayed (see block 569).

The method 541 may include, at block 557, modifying a visible or non-visible component of an object located in the multi-dimensional space forming a portion of the wagering game prior to conducting a simulation at block 559. The object may later be displayed (see block 569).

The method 541 may go on to include conducting a simulation of the wagering game based on intermediate-time game parameter values in response to receiving the player input value at block 559. If the initial result of the simulation substantially matches the selected statistical outcome, as determined at block 563, then the method 541 may go on to display some portion of the simulation at block 569.

If the initial result of the simulation does not substantially match the selected statistical outcome, as determined at block 563, the method 541 may go on to include modifying one or more intermediate-time game parameter values at block 567 so that conducting the simulation based on the modified intermediate-time game parameter values at block 559 yields a modified result that substantially matches the selected statistical outcome. One or more sensory values, such as a sound of the wagering game, a smell of the wagering game, a taste of the wagering game, and a tactile sensation of the wagering game may be modified based on the modified player input value, the modified intermediate-time game parameter values, or both.

In some embodiments, the modified result of the simulation is determined in part by physical properties attributed to an object located in a multi-dimensional space forming a portion of the wagering game. Once the selected statistical outcome is substantially matched, the method 541 may include displaying at least a portion of the simulation based on the modified intermediate-time game parameter values at block 569.

In many embodiments, the wagering game may comprise a combat game, a sports game, and a casino game, among others. A combat game might comprise a hand-to-hand combat game, a hand-held weapons game, a firearms game, a land battle game, an aerial battle game, a sea battle game, and a space battle game, among others. A sports game might comprise track, football, soccer, basketball, hockey, bowling, racing, darts, sculling, cycling, sculling, tennis, and skating, among others. A casino game might comprise a roulette game, a craps game, a slots game, a wheel of fortune, and a card game, among others.

Turning now to FIG. 5C, it can be seen that in some embodiments, a method 571 that operates to achieve a selected statistical outcome by using reverse simulation begins at block 573 by presenting a wagering game upon which monetary value may be wagered at block 573, and acquiring an original player input value associated with the wagering game at block 575.

The method 571 may go on to block 577 with randomly selecting a statistical outcome of the wagering game. The method 571 may go on to block 581 with running a simulation in reverse from the selected statistical outcome to determine at least one of a modified starting game parameter value, a modified intermediate-time game parameter value, and a modified player input value. That is, running the simulation in reverse operates in this case to determine at least one of a modified starting game parameter, intermediate-time game parameter, player input value, and/or physical property attributed to an object located within a multi-dimensional space representing a portion of the wagering game as time progresses in the reverse direction, using a wagering game outcome (e.g., a randomly selected statistical outcome) as the starting point.

The method 571 may include modifying original values to match the modified values determined by the reverse simulation. Thus block 583 may include modifying original starting game parameter values, original intermediate-time game parameter values, and/or original player input values to provide the modified starting game parameter values, the modified intermediate-time game parameter values, and the modified player input values, respectively. Sensory values, such as the sound of the wagering game, the smell of the wagering game, the taste of the wagering game, and a tactile sensation of the wagering game can be modified based on the original player input value or the modified player input value, or both. In some embodiments, after the modified values are determined in block 583, the method 571 goes on to include display of a simulation running forward, where the result of the simulation is determined by the modified values, at block 593.

Alternatively, or in addition, one or more simulations running forward can be undertaken to determine outcomes based on modified parameter values at block 587. That is, a simulation running forward can operate to combine a set of original or modified starting game parameters, original or modified player input values, original or modified intermediate-time game parameters, and/or physical properties attributed to an object located within a multi-dimensional space representing a portion of a wagering game, to determine the wagering game outcome as time progresses in a forward direction.

The starting point of the simulation running forward can be defined in a number of ways. For example, the method 571 may include running the simulation forward from a starting point defined approximately by the time the original player input value is acquired at block 575. The method 571 may include running the simulation forward from a starting point determined by running the simulation in reverse (e.g., until a specified intermediate-time game parameter value is achieved). The method 571 may include running the simulation forward from a starting point determined by running the simulation in reverse, and also by the selected statistical outcome.

If the selected statistical outcome is not substantially matched by the result of the simulation running forward, as determined at block 589, then the method 571 may continue with further modifying values at block 583, described above. If the selected statistical outcome is substantially matched by the result of the simulation running forward, as determined at block 589, then the method 571 may continue with dynamically determining a bonus award outcome based on the selected statistical outcome at block 591. Alternatively, or in addition, the method 571 may include dynamically determining a bonus award outcome based on an RNG output at block 591. The method 571 may go on to include displaying at least a portion of the simulation running forward at block 593, perhaps based on one or more of modified starting game parameter values, modified intermediate-time game parameter values, and modified player input values.

Making further use of the craps game dice roll example outlined above, an example of this type of operation involves gathering starting game parameter values (e.g., dice table layout and material composition) and original player input value data as the player rolls the dice, perhaps measuring hand motion (e.g., velocity and angle) as the dice are thrown, and applying all of this data to a simulation running forward to determine that the result of the roll is 6-6. The impact point of the dice on the wall of the table, the elevation height of the dice above the table, as well as their rotational speed when they hit the wall may be recorded to determine these values as intermediate-time game parameters.

If the selected statistical outcome is actually 1-1, then the simulation can be run in the reverse direction to determine a modified intermediate-time game parameter value (e.g., different table wall impact location, or die rotational speed) that results when the modified resulting roll of 1-1 is used as a starting point. The simulation can be further run in the reverse direction to determine the velocity and angle of release from the player's hand as a modified player input value that is determined when a roll of 1-1 is used as a starting point.

It should be noted that the methods described herein, unless specifically claimed otherwise, do not have to be executed in the order described, or in any particular order. Moreover, various activities described with respect to the methods identified herein can be executed in iterative, repetitive, serial, or parallel fashion. The activities of the various methods shown in FIGS. 5A-5C may also be combined. Information, including parameters, commands, operands, and other data, can be sent and received in the form of one or more carrier waves.

Upon reading and comprehending the content of this disclosure, one of ordinary skill in the art will understand the manner in which a software program can be launched from a computer-readable medium in a computer-based system to execute the functions defined in the software program. One of ordinary skill in the art will further understand the various programming languages that may be employed to create one or more software programs designed to implement and perform the methods disclosed herein. The programs may be structured in an object-orientated format using an object-oriented language such as Java or C++. Alternatively, the programs can be structured in a procedure-orientated format using a procedural language, such as assembly or C. The software components may communicate using any of a number of mechanisms well known to those skilled in the art, such as application program interfaces or interprocess communication techniques, including remote procedure calls. The teachings of various embodiments are not limited to any particular programming language or environment.

Thus, other embodiments may be realized. For example, an article of manufacture, such as a computer, a memory system, a magnetic or optical disk, some other storage device, and/or any type of electronic device or system may include one or more processors coupled to a machine-readable medium such as a memory (e.g., removable storage media, as well as any memory including an electrical, optical, or electromagnetic conductor) having instructions stored thereon (e.g., computer program instructions), which when executed by the one or more processors result in performing any of the actions described with respect to the methods above.

Thus, referring back to FIG. 3, it can be seen that instructions may be stored in the memory 328, perhaps as part of the wagering game presentation unit 332, which, when executed by the processor(s) 326, result in presentation of a wagering game. In accordance with the simulation capabilities described to this point, for example, an article, such as an article of manufacture (e.g., a CD-ROM or programmable read-only memory), may comprise a machine readable medium, such as the memory 328, having instructions stored thereon, wherein the instructions, when executed by one or more processors 326, result in presenting a wagering game upon which monetary value may be wagered, acquiring an original player input value associated with the wagering game, randomly selecting a statistical outcome of the wagering game, and running a simulation in reverse from the selected statistical outcome to determine at least one of a modified starting game parameter value, a modified intermediate-time game parameter value, and a modified player input value.

As execution continues, the instructions stored in the machine readable medium may further result in modifying one or more of an original starting game parameter value, an original intermediate-time game parameter value, and the original player input value to provide the modified starting game parameter value, the modified intermediate-time game parameter value, and the modified player input value, respectively. Further execution may result in displaying at least a portion of the simulation running forward based on the at least one of the modified starting game parameter value, the modified intermediate-time game parameter value, and the modified player input value.

Additional activities resulting from execution may include downloading a physical model of an object to serve as input data to the simulation, downloading motion capture data to modify at least one physical property associated with the object, and receiving data from a physics engine (e.g., a physics engine included in the graphics engine 340 of FIG. 3) to determine an interaction between objects, such as the object with modified physical properties and a different object. Any of these activities may be included as part of the methods described with respect to FIGS. 5A-5C.

CONCLUSION

Apparatus, systems and methods for presenting a wagering game in which game play is simulated in both forward and reverse directions to achieve a randomly selected statistical outcome have been described. Implementing the apparatus, systems, and methods disclosed herein may provide unexpected variety for gaming machine players via game play scenarios modified by simulation-determined values.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the inventive subject matter.

Some portions of the Detailed Descriptions are presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of actions leading to a desired result. The actions are those involved in physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the discussion, terms such as "processing" or "computing" or "calculating" or "determining" or "displaying" or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

The Abstract of the Disclosure is provided to comply with 37 C.F.R. §1.72(b) and will allow the reader to quickly ascertain the nature of the technical disclosure. It is submitted with the understanding that it will not be used to interpret or limit the scope or meaning of the claims.

The description of the various embodiments is to be construed as exemplary only and does not describe every possible instance of the invention. Numerous alternatives could be implemented, using combinations of current or future technologies, which would still fall within the scope of the claims. In this Detailed Description of various embodiments, a number of features are grouped together in a single embodiment for the purpose of streamlining the disclosure. This method of disclosure is not to be interpreted as an implication that the claimed embodiments have more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A computer-implemented method of conducting a wagering game on a wagering game machine, the wagering game machine including one or more input devices, one or more display devices, and one or more processors, the method comprising:

receiving, via at least one of the one or more input devices, an indication of a wager from a player, the wager initiating the wagering game;

randomly selecting, via at least one of the one or more processors, a statistical outcome of the wagering game;

receiving, via at least one of the one or more input devices, an original player input value from the player, wherein the original player input value affects a first simulated outcome of the wagering game;

prior to displaying the selected statistical outcome to the player, conducting a first simulation of playing the wagering game from the original player input value to the resulting first simulated outcome;

in response to the first simulated outcome not matching with the selected statistical outcome, modifying, via at least one of the one or more processors, one or more of a game parameter value and the original player input value to provide a modified player value that is selected such that a second simulated outcome resulting from the modified player value yields a modified playing result that matches with the selected statistical outcome; and displaying, via at least one of the one or more display devices, at least a portion of the second simulation of playing the wagering game based on the modified player value and yielding the modified playing result.

2. The method of claim 1, wherein the original player input value is modified by changing one or more physical properties attributed to an object located in a multi-dimensional space.

3. The method of claim 2, wherein the original player input value assigns a property to the object.

4. The method of claim 2, wherein the one or more physical properties are modified based on the selected statistical outcome and used to provide a physical property input for the second simulated outcome.

5. The method of claim 2, further comprising determining an interaction between the object and a different object within the multi-dimensional space after modifying the original player input value and displaying the interaction as part of the simulation yielding the modified playing result.

6. The method of claim 1, wherein the original player input value is filtered to exclude values less than or greater than a preselected threshold.

7. The method of claim 1, wherein at least one of a sound of the wagering game, a smell of the wagering game, a taste of the wagering game, and a tactile sensation of the wagering game is modified based on one of the original player input value and the modified player input value.

8. A computer-implemented method of conducting a wagering game on a wagering game machine, the wagering game machine including one or more input devices, one or more display devices, and one or more processors, the method comprising:

receiving, via at least one of the one or more input devices, an indication of a wager from a player, the wager initiating the wagering game;

randomly selecting, via at least one of the one or more processors, a statistical outcome of the wagering game;

receiving, via at least one of the one or more input devices, an original player input value from the player, wherein the original player input value affects a first simulated outcome of the wagering game;

prior to displaying the selected statistical outcome to the player, conducting a first simulation of playing the wagering game from the original player input value to the resulting first simulated outcome;

in response to the first simulated outcome not matching with the selected statistical outcome, modifying, via at least one of the one or more processors, one or more intermediate-time game parameter values such that a second simulated outcome resulting from the one or more modified intermediate-time game parameter values yields a modified playing result that matches with the selected statistical outcome; and displaying, via at least one of the one or more display devices, at least a portion of the second simulation of playing the wagering game based on the one or more modified intermediate-time game parameter values and yielding the modified playing result.

9. The method of claim 8, further comprising, modifying, via at least one or the one or more processors and based on the selected statistical outcome, at least one of a starting game parameter value and the original player input value to provide a modified feature that affects the first simulated outcome.

10. The method of claim 8, further comprising modifying the original player input value by changing one or more physical properties attributed to an object located in a multi-dimensional space forming a portion of the wagering game.

11. The method of claim 10, wherein the object is a representation of one of a human, an animal, a vehicle, a target, and a game-playing piece.

12. The method of claim 10, further comprising determining an interaction between the object and a fluid forming a portion of the multidimensional space, and displaying the interaction as part of the second simulation yielding the modified playing result.

13. The method of claim 10, wherein the one or more physical properties include at least one of mass, life-span, motion, density, hardness, chemical composition, and volume.

14. The method of claim 8, further comprising, prior to conducting the second simulation to yield the modified playing result, modifying a non-visible component of an object located in a multi-dimensional space forming a portion of the wagering game.

15. A computer-implemented method of conducting a wagering game on a wagering game machine, the wagering game machine including one or more input devices, one or more display devices, and one or more processors, the method comprising:

receiving, via at least one of the one or more input devices, an indication of a wager from a player, the wager initiating the wagering game;

randomly selecting, via at least one of the one or more processors, a statistical outcome of the wagering game;

receiving, via at least one of the one or more input devices, an original player input value from the player, wherein the original player input value affects any outcome of the wagering game proceeding from the original player input value;

prior to displaying the selected statistical outcome to the player, conducting a first simulation of playing the wagering game in reverse from the selected statistical outcome to determine a modified value set corresponding to the selected statistical outcome and including at least one of a modified starting game parameter value, a modified intermediate-time game parameter value, and a modified player input value;

modifying, via at least one of the one or more processors, another value set corresponding to the original player input value and including at least one of an original starting game parameter value, an original intermediate-time game parameter value, and the original player input value such that the another value set matches with the modified value set; and displaying, via at least one of the one or more display devices, at least a portion of a second simulation of playing the wagering game running forward based on the modified value set, and yielding the selected statistical outcome.

16. The method of claim 15, further comprising modifying the original player input value by changing one or more physical properties attributed to an object located in a multi-dimensional space forming a portion of the wagering game.

17. The method of claim 16, wherein the object is a representation of one of a human, an animal, a vehicle, a target, and a game-playing piece.

18. The method of claim 16, wherein the original player input value assigns a property to the object.

19. The method of claim 16, further comprising determining an interaction between the object and a different object within the multi-dimensional space after modifying the original player input value, and displaying the interaction as part of the second simulation yielding the selected statistical outcome.

20. The method of claim 15, wherein the original player input value is filtered to exclude values less than or greater than a preselected threshold.

* * * * *